United States Patent [19]

Padgett

[11] 3,812,293

[45] May 21, 1974

[54] ARRANGEMENT FOR PROVIDING PRIORITY OVERRIDE OF BILLING BUFFER ENTRY SELECTOR

[75] Inventor: Richard A. Padgett, Lombard, Ill.

[73] Assignee: GTE Automatic Electric Laboratories Incorporated, Northlake, Ill.

[22] Filed: Jan. 2, 1973

[21] Appl. No.: 320,371

[52] U.S. Cl. .......................... 179/7 R, 179/7.1 TD

[51] Int. Cl. .......................................... H04m 15/10

[58] Field of Search .......................... 179/7, 7.1 TP

[56] References Cited

UNITED STATES PATENTS 3,673,333 6/1972 Le Strat et al. .................... 179/7 R 3,307,150 2/1967 Bartlett .............................. 179/7 R

*Primary Examiner*—Kathleen H. Claffy
*Assistant Examiner*—Gerald Brigance
*Attorney, Agent, or Firm*—Bernard E. Franz

[57] ABSTRACT

A permanent record of billing information is produced from trunk scanner entries and initial entries from a call processor, with the trunk scanner and the call processor being alternately provided access to the billing buffer. The trunk scanner has only a single queue providing access to the billing buffer and if this queue is full when another entry is attempted, trunk scanner congestion can occur. The arrangement of the present invention, should congestion occur, provides priority override for the trunk scanner entries over the initial entries, until the queue is empty.

7 Claims, 5 Drawing Figures

ARRANGEMENT FOR PROVIDING PRIORITY OVERRIDE OF BILLING BUFFER ENTRY SELECTOR

BACKGROUND OF THE INVENTION

This invention relates to a centralized automatic message accounting system. More particularly, it relates to a method and arrangement providing a priority override of the billing buffer entry selector in such a system.

In the centralized automatic message accounting system, a billing buffer accumulates data from a call processor and a trunk scanner to produce a permanent record of billing information. The billing buffer entry selector normally monitors requests for initial entries from the call processor and requests for trunk scanner entries from the trunk scanner, and alternately provides access to the billing buffer for these entries.

The trunk scanner entries are coupled through a trunk scanner formater buffer, and the latter, in order to save logic, has only a single position queue for providing the entries into the billing buffer. Accordingly, a trunk scanner congestion can occur if another trunk scanner entry is attempted while the previous entry is still in the buffer (the queue is filled) since there is no place to store the new entry. With the arrangement of the present invention, should congestion occur, priority override is provided for the trunk scanner entries over the initial entries, until the queue is empty. Also, during this time, the trunk scanner is stopped to allow billing data to be retained. When the congestion clears, the trunk scanner automatically restarts, and the priority override is removed.

Accordingly, it is an object of the present invention to provide an improved centralized automatic message accounting system.

More particularly, it is an object to provide a method and arrangement for providing a priority override of the billing buffer entry selector in the event of congestion, in such a system.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE INVENTION

Figure 1:
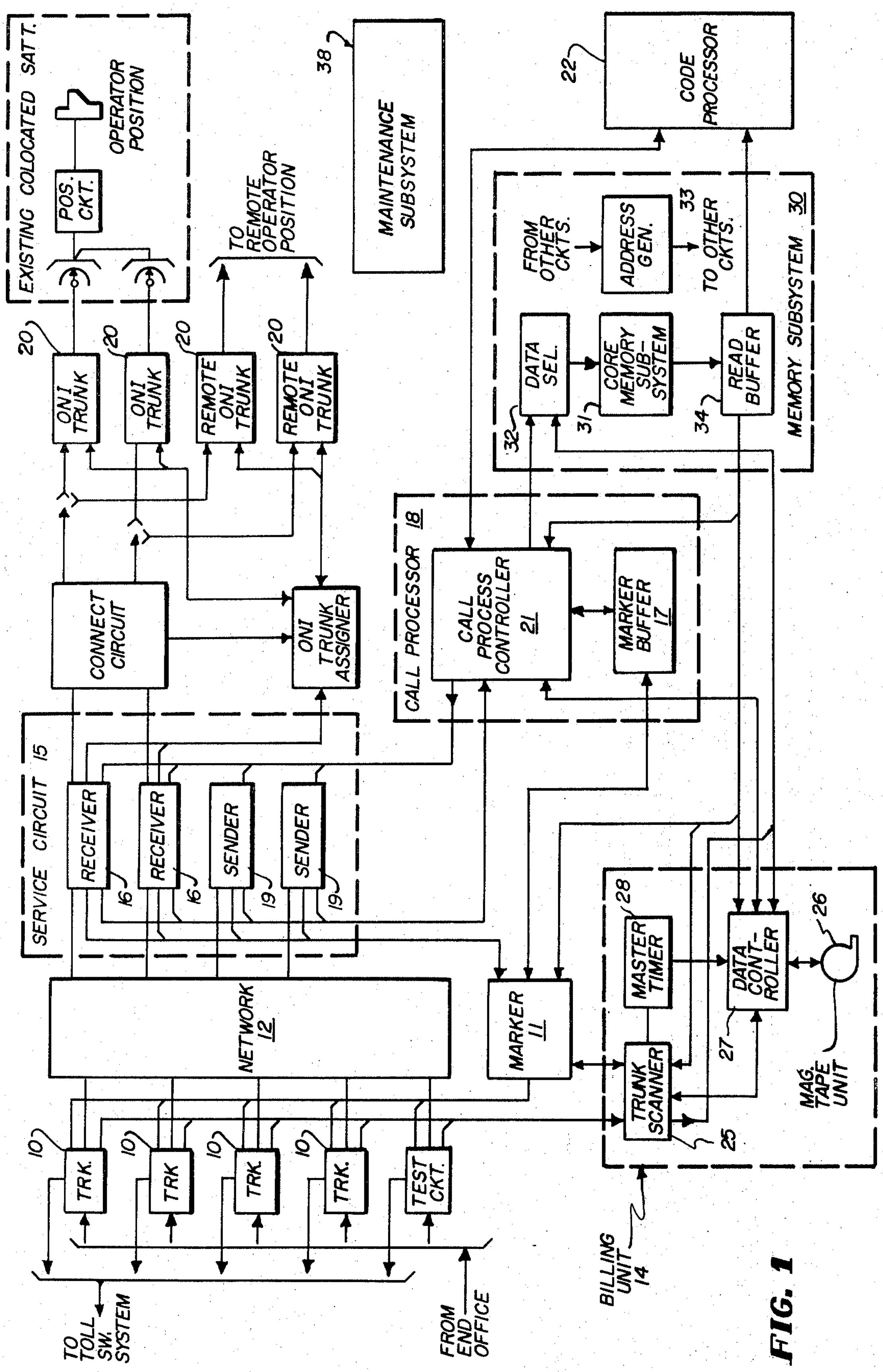
FIG. 1 is a block diagram schematic of the centralized automatic message accounting system.

Referring now to the drawings, in FIG. 1 the centralized automatic message accounting system is illustrated in block diagram, and the functions of the principal equipment elements can be generally described as follows. The trunks 10, which may be either multifrequency (MF) trunks or dial pulse (DP) trunks, provide an interface between the originating office, the toll switching system, the marker 11, the switching network 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2000 inlets and 80 outlets. Each inlet extends into an A matrix and is defined by an inlet address. Each outlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in a trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities.

The functions of the receivers 16 are to receive MF 2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multi-entry system. Once this information is passed to the billing unit 14, where a complete initial entry is formated, the call will be forwarded to the toll switch for routing.

The call processor 18 consists of the marker buffer 17 and a call processor controller 21. There are 77 call stores in the call processor 18, each call store handling one call at a time. The call processor 18 operates on the 77 call stores on a time-shared basis. Each call store has a unique time slot, and the access time for all 77 call stores is equal to 39.4 MS, plus or minus 1 percent.

The marker buffer 17 is the electronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call store has eight rows and each row consists of 50 bits of information. The first and second rows are repeated in rows 7 and 8, respectively. Each row consists of two physical memory words of 26 bits per word. Twenty-five bits of each word are used for storage of data, and the 26th bit is a parity bit.

The call processor controller 21 makes use of the information stored in the call store to control the progress of the call. It performs digit accumulation and the sequencing of digits to be sent. It performs fourth digit 0/1 blocking on a 6 or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which are originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via a tape transport operating in a continuous recording mode. After the calling and called director numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The initial entry will include the time. Additional entries to the billing unit 14 contain answer and disconnect information.

The trunk scanner 25 is the means of conveying the various states of the trunks to the billing unit 14. The trunk scanner 25 is connected to the trunks by a highway extending from the billing unit 14 to each trunk. Potentials on the highway leads will indicate states in the trunks.

Each distinct entry (initial, answer, disconnect) will contain a unique entry identity code as an aid to the electronic data processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the 9 channel billing tape. The read function will allow the tape unit to be used to update the memory.

The recorder operates in the continuous mode at a speed of 5 inches per second, and a packing density of 800 bits per inch. Billing data is recorded in a multi-entry format using a 9 bit EBCDIC character (extended binary coded decimal interchange code). The memory subsystem 30 serves as the temporary storage of the call record, as the permanent storage of the code tables for the code processor 22, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word being read out, to be presented to the read buffer 34. With a read/restore command, the data being read out is also returned to core memory for storage at its previous location.

The method of operation of a typical call in the system, assuming the incoming call is via an MF trunk can be described as follows. When a trunk circuit 10 recognizes the seizure from the originating office, it will provide an off-hook to the originating office and initiate a call-for-service to the marker 11. The marker 11 will check the equipment group and position scanners to identify the trunk that is requesting service. Identification will result in an assignment of a unique 4 digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of "ST," the call processor controller 21 will command the receiver 16 to instruct the trunk circuit 10 to return an off-hook to the calling office, and it will request the code processor 22.

The code processor 22 utilizes the called number to check for EAS blocking and other functions. Upon completion of the analysis, the code processor 22 will send to the call processor controller 21 information to route the call to an announcement or tone trunk, at up to four prefix digits if required, or provide delete information pertinent to the called number. If the call processor controller 21 determined that the call is an ANI call, it will receive, accumulate and store the calling number in the same manner as was done with the called number. After the call process controller 21 receives ST, it will request the billing unit 14 for storage of an initial entry in the billing unit memory. It will also command the receiver 16 to drop the trunk to receiver connection. The call processor controller 21 now initiates a request to the marker 11 via the marker buffer 17 for a trunk to sender connection. Once the marker 11 has made the connection and has transferred the identities to the marker buffer 17, the marker buffer will dump this information into the appropriate call store. The call processor controller 21 now interrogates the sender 19 for information that delay dial has been removed by the routing switch (crosspoint tandem or similar). Upon receipt of this information the call processor controller 21 will initiate the sending of digits including "KP" and "ST". The call process controller 21 will control the duration of tones and interdigital pause. After sending of ST, the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1370 characters. Once the billing unit memory is filled, the magnetic tape unit 26 is called and the contents of the billing unit memory is recorded onto the magnetic tape.

The final result of actions taken by the system on a valid call will be a permanent record of billing information stored on magnetic tape in multi-entry format consisting of initial, answer, and disconnect or forced disconnect entries. The data controller 27 in the billing unit 14 accumulates, organizes and routes data from other circuits within the system in order to produce this permanent record of billing information. The initial entry portion of the multi-entry format is accumulated in two different parts of the system, with some being stored in the call stores of the call processor 18 and some being stored in an initial entry pre-store 41 (FIG. 2) of the data controller 27. The answer and disconnect (or forced disconnect) entries are provided by the trunk scanner 25.

Figure 2:
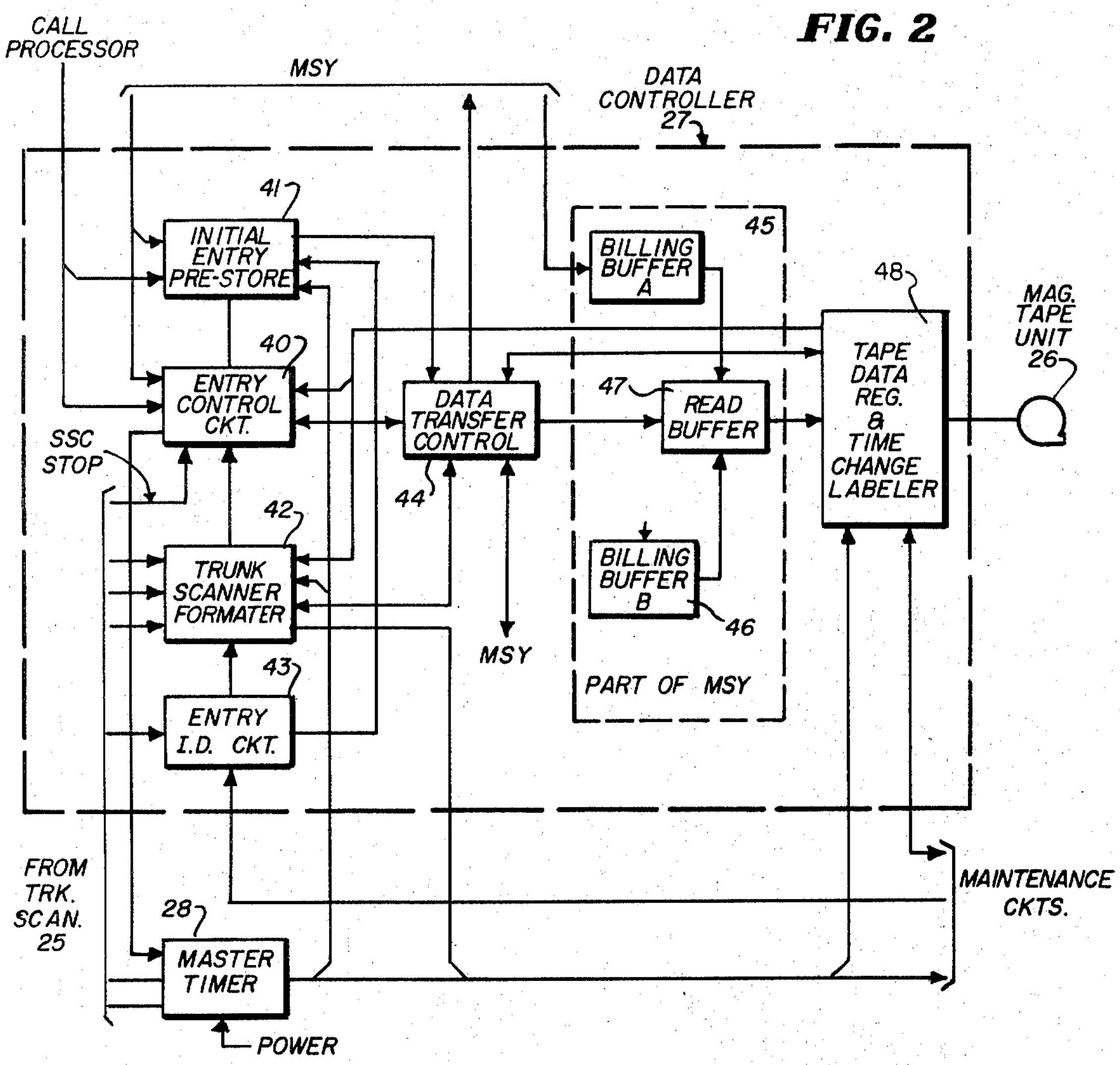
FIG. 2 is a block diagram schematic of the data controller.

The data controller 27 is shown in block diagram in FIG. 2 and can be seen to include the initial entry pre-store 41. The call processor 18 does not provide all the data required for a complete initial entry. These words must be added which are registered in this initial entry pre-store 41. These words contain the initial entry identifier and the time existing when the request for entry was accepted by the entry control circuit 40.

The trunk scanner formater 42 stores entries from the trunk scanner 25, with data for the entries being supplied by the trunk scanner 25, the master timer 28 and the entry identification circuit 43.

The entry identification circuit 43 receives an indication of the type of entry required directly from the trunk scanner 25. As soon as the entry required is specified, the entry identification circuit 43 gates the proper entry identification digits to the TSF buffer 60 (FIG. 4) of the trunk scanner formater 42 for storage.

The data transfer cntrol 44 transfers data from the trunk scanner formater 42 and the initial entry pre-store 41 to the billing buffer 45, or 46, depending upon which of the two is in the WRITE mode.

The tape data register 48 is comprised of circuits to insure the proper flow of data to the magnetic tape unit 26, as the data is being taken out of the billing buffer 45, or 46, to be recorded on tape.

Figure 3:
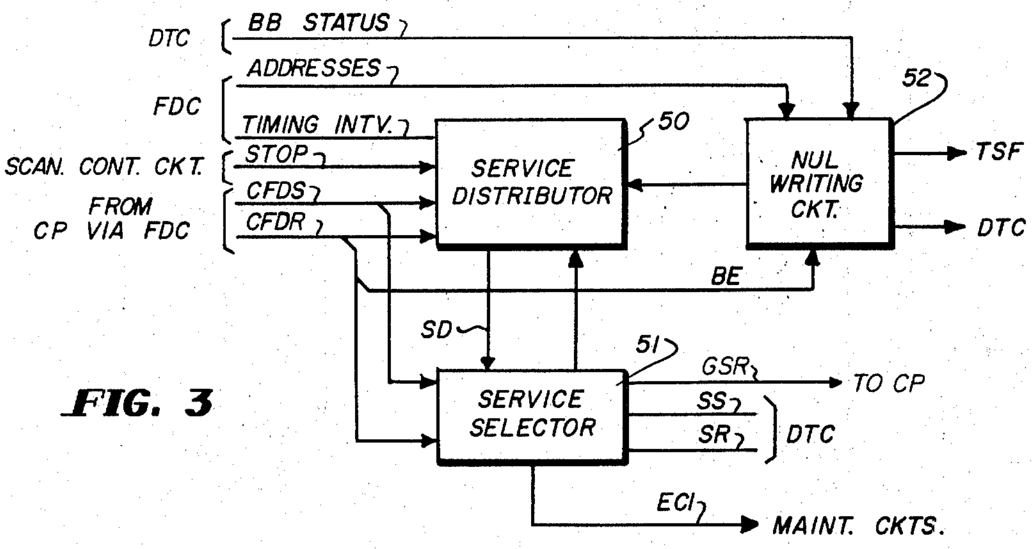
FIG. 3 is a block diagram schematic of the entry control circuit.

The entry control circuit 40 is shown in block diagram in FIG. 3, and can be seen to include a service distributor 50 which determines whether an initial entry request or a trunk scanner entry will be honored by the entry control circuit 40. Calls for initial entries (CFDR) from the call processor 18 will occur during a row word pulse one (RWP1) which is a pre-established timing interval, if an entry is required. The service distributor 50 will allow the CFDR, if a trunk scanner entry is not being handled when the CFDR is requested. The CFDR's will be monitored during RWP1 from time slots TX4 to TX6. If an initial entry is not requested during this time interval, the service distributor returns to the task of monitoring calls from the trunk scanner formater 42.

Although the service distributor 50 monitors calls for entries continuously, the entry control must be idle before the call is accepted. When a call is accepted, the service selector 51 returns a command to the requesting circuit to signify that it has access to the billing buffer and the entry can be written into memory. A command is also sent forward to the data transfer control 44 so that either the initial entry pre-store 41 or the trunk scanner formater 42 can be connected to the billing buffer.

The nul writing circuit 52 is provided for writing nuls into the billing buffer, under pre-determined certain circumstances.

Figure 4:
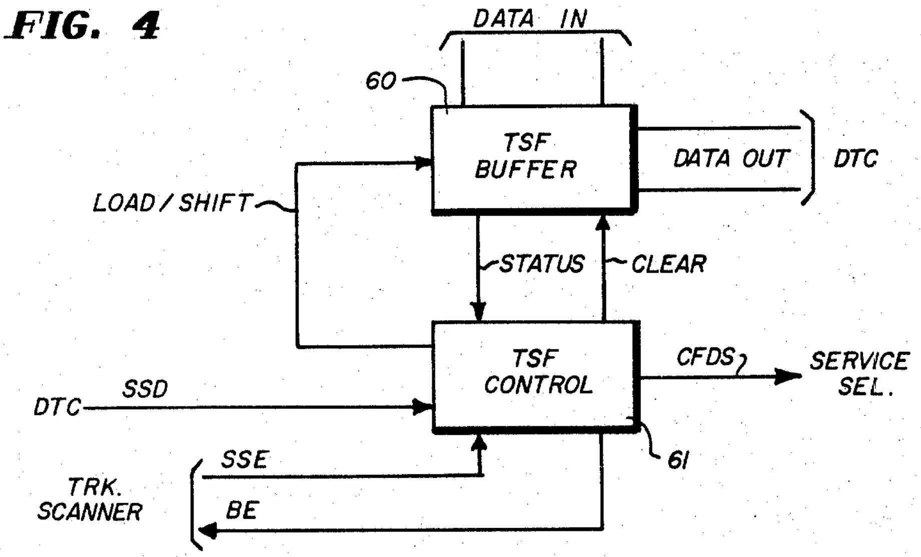
FIG. 4 is a block diagram schematic of the trunk scanner formater.

The trunk scanner formater 42 is shown in block diagram in FIG. 4, and can be seen to include a TSF buffer 60 and a TSF control 61. The TSF buffer 60 is a shift register that shifts one word at a time, and stores four words. It contains one indicator bit per word that identifies whether or not that word has been loaded. The indicator bits are shifted along with the word.

The TSF buffer 60 provides gating of the signals from the entry identification circuit 43, the trunk scanner 25 and the master timer 28 in order to properly format the data as it is loaded.

The TSF control 61 receives requests to store entries directly from the trunk scanner 25, and monitors the operation of the TSF buffer 60 by inspecting the indicator bits assigned to each word.

When the indicator bits show that the TSF buffer 60 is empty, the TSF control 61 accepts entries from the trunk scanner 25. When the TSF buffer 60 is filled, as signaled by the indicator bits, the TSF control requests the entry control circuit 40 to dump the TSF buffer contents into memory.

Loading of the TSF buffer 60 is controlled by the TSF control 61, however, after the TSF buffer is loaded and the entry control circuit 40 has granted the request to dump the entry into memory, shifting is performed in step with the system's timing generator (not shown).

Initially, the data transfer control 44 will be set with one of the two billing buffers 45 and 46 in the WRITE mode and the other idle. All requests for billing entries are processed in the entry control circuit 40. The latter accepts requests for entries as soon as one billing buffer is ready to store call records.

Requests for initial entries originate in the call processor 18. If requests are being accepted, and the entry control is idle, the request will be served. When the request is accepted, notification is returned to the call processor 18 that it has access to the billing unit 14. The service selector 51 sends a serve register SR signal to the data transfer control 44 to connect the initial entry pre-store 41 to the memory data selector bus. The data transfer control confirms that the bus is connected by returning a SRDN (send register data now) signal so that the data can be written into memory.

The requests for answer and disconnect entries originate in the trunk scanner 25. If requests are being accepted and the entry control circuit 40 is idle, the request will be served. When the request is accepted, the service selector 51 sends a command forward to the data transfer control 44 to connect the trunk scanner formater 42 to the memory data selector bus. Confirmation that the bus is connected is returned from the data transfer control 44.

In writing the trunk scanner entries into the billing buffer, a queue of only one entry is provided in the TSF buffer 60 in order to save logic. Accordingly, whenever any one of the four words comprising a trunk scanner entry still remains in the TSF buffer 60, the queue is filled. If another trunk scanner entry into the TSF buffer 60 is attempted while the previous entry is still in the queue, that is, the queue is filled, trunk scanner congestion can occur since there is no place to store the new entry.

Whenever congestion occurs, the trunk scanner 25 stops, and calls are delayed while full access to the billing buffer 45, or 46, is given over to trunk scanner entries. In other words, a priority override of the entry control circuit 40 for the billing buffer is provided for trunk scanner entries in the event of trunk scanner congestion. Stopping the trunk scanner 25 allows billing data to be retained and simultaneously allows the TSF buffer 60 to empty faster in order to alleviate the congestion. When the congestion clears, the trunk scanner 25 automatically restarts and the override is removed.

Figure 5:
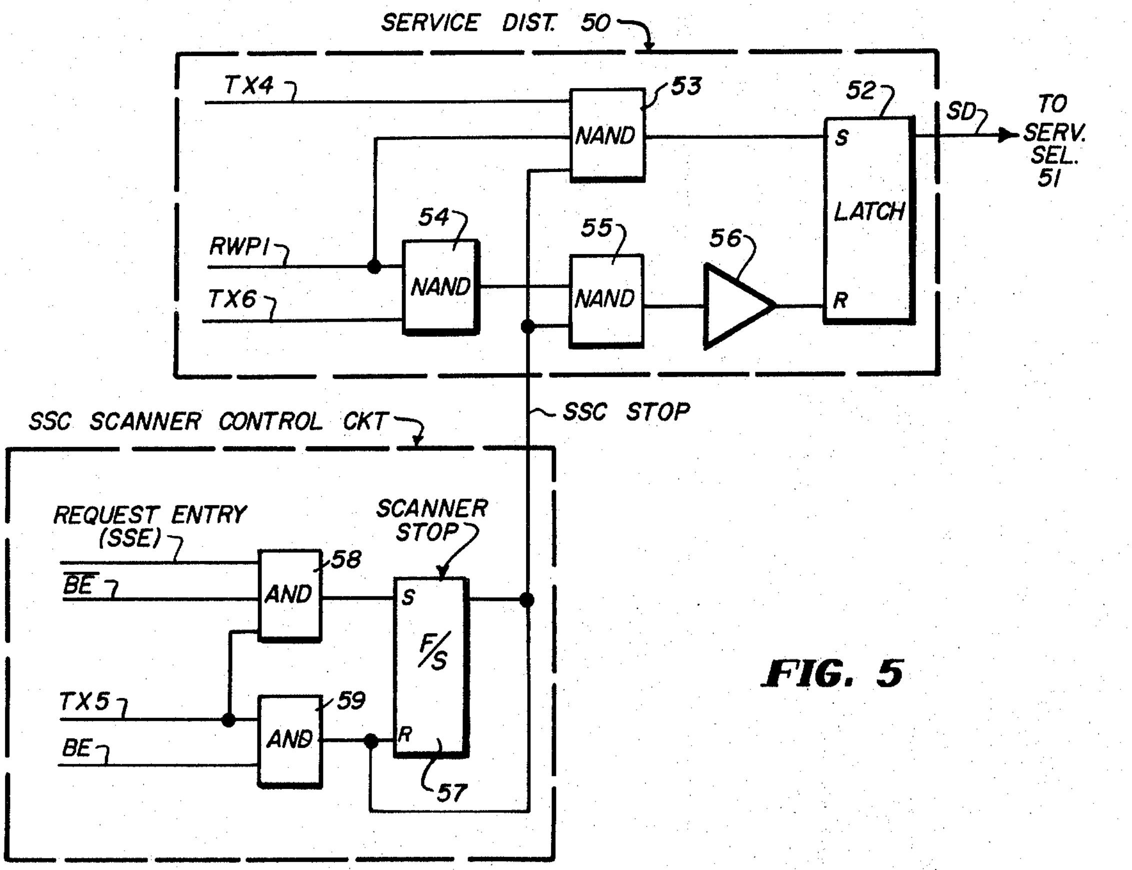
FIG. 5 is a block diagram schematic illustrating the priority override arrangement.

Referring now to FIG. 5, the manner in which the priority override is provided can be seen and understood. The service distributor 50 of the entry control circuit 40 includes a billing buffer entry selector latch 52 having an output SD coupled to the service selector 51. When the latch 52 is set, the SD command to the service selector 51 causes the latter to give initial entries access to the billing buffer, in the manner more particularly described above. When the latch 52 is reset, the SD command is removed ($\overline{SD}$) and the service selector 51 is caused to give trunk scanner entries access to the billing buffer, again in the manner more particularly described above. As can be seen, the latch 52 normally is set during row word pulse 1 (RWP1) and time interval TX4 (two established intervals within the system operation) via the gate 53, and is reset during RWP1 and TX6 via the gates 54 and 55 and the inverter 56. Accordingly, the latch 52 is continuously set and reset to cause the service selector 51 to alternately provide initial entries and trunk scanner entries access to the billing buffer.

The trunk scanner 25 includes a scanner control circuit and a status analyzer (neither of which are shown) which control the operation of the trunk scanner and analyze the status for each trunk and determines what action, if any, is required as a result of these operations, respectively. The scanner control circuit includes a scanner stop flip-flop 57 which is set by command signals coupled to it through an AND gate 58, and is reset by command signals coupled to it through an AND gate 59.

As indicated above, the trunk scanner 25 is stopped when a trunk scanner entry is requested and the queue of the TSF buffer 60 is not empty. At this time, the TSF selector 61 couples a queue not empty ($\overline{BE}$) signal to the AND gate 58. Accordingly, during the time interval TX5 when the trunk scanner entries normally are written into the TSF buffer 60, the AND gate 58 is enabled to set the stop scanner flip-flop 57 upon receipt in coincidence of the request entry signal (SSE — store scanner entry) from the status analyzer, the TX5 and the $\overline{BE}$ signals. When the stop scanner flip-flop 57 sets, the trunk scanner 25 is stopped. Simultaneously, the output signal from the stop scanner flip-flop 57 is coupled to and enables the NAND gate 55, and disables the NAND gate 53, so that the NAND gate 55 can reset the entry selector latch 52 via the inverter 56. Whn the entry selector latch 52 resets, $\overline{SD}$ becomes true and the service selector 51 gives full access to trunk scanner entries from the TSF buffer 60.

Normally, when the trunk scanner 25 is not stopped, the entry selector latch 52 sets via NAND gate 53, during each RWP1 and TX4 command signals, and is reset via the NAND gates 54 and 55 and the inverter 56, during each RWP1 and TX6 command signals. Access to the billing buffer 45, or 46, therefore is alternately provided for initial entries and trunk scanner entries. However, whenever the entry selector latch 52 is reset, the trunk scanner entries are given priority over the initial entries. During congestion, priority will be given to the trunk scanner entries, until the TSF buffer 60 is empty, at which time the TSF selector 61 will return a buffer empty BE signal. During the next time interval TX5, this signal in coincidence with the buffer empty BE signal will enable the AND gate 59, to reset the scanner stop flip-flop 57, restarting the trunk scanner 25 and removing the override on the entry selector 52.

It will thus be seen that the objects set forth above, among those made apparent from the preceding description, are efficiently attained and certain changes may be made in carrying out the above method. Accordingly, it is intended that all matter contained in the above description shall be interpreted as illustrative and not in a limiting sense.

Now that the invention has been described, what is claimed as new and desired to be secured by Letters Patent is:

1. In a communication system wherein complete records of information related to calls within said system are produced from data comprising initial entries from a call processor and trunk scanner entries from a trunk scanner, said system comprising a billing buffer for storing said initial enries and said trunk scanner entries, a billing buffer entry selector monitoring said call processor for requests for initial entries and said trunk scanner for trunk scanner entries and providing them access to said billing buffer for storing said entries therein, a trunk scanner buffer, said trunk scanner entries being coupled from said trunk scanner through said trunk scanner buffer to said billing buffer, said trunk scanner buffer having only a single queue for storing and coupling said trunk scanner entries into said billing buffer, and control means for providing a priority override of said billing buffer entry selector for said trunk scanner entries in the event another request for a trunk scanner entry is received while said queue is full to avoid trunk scanner congestion, said control means comprising latch means in said billing buffer entry selector, gating means coupled to said latch means, said gating means normally being enabled with established command signals coupled thereto in coincidence to operate said latch means to a first state to provide said call processor access to said billing buffer and to a second state to provide said trunk scanner access to said billing buffer, and latch control means operated upon receipt in coincidence of command signals indicating that said queue is full and a request for a trunk scanner entry is disable said gating means to prevent said latch means from being operated to said first state, whereby said latch means remains set in said second state and provides said trunk scanner access to said billing buffer until the trunk scanner congestion is cleared.

2. The communication system of claim 1, wherein said latch control means comprises gate disabling means, gating means coupled to said gate disabling means, said gating means operated upon receipt in coincidence of command signals indicating that said queue is full and a request for a trunk scanner entry to set said gate disabling means, said gate disabling means upon being set disabling said gating means coupled to said latch means to prevent said latch means from being operated to said first state.

3. The communication system of claim 1, wherein said latch control means comprises gate disabling means, gating means coupled to said gate disabling means, said gating means operated upon receipt in coincidence of command signals indicating that said queue is full and a request for a trunk scanner entry to set said gate disabling means, said gate disabling means upon being set disabling said gating means coupled to said latch means to prevent said latch means from being operated to said first state.

4. The communication system of claim 1, wherein said latch control means comprises gate disabling means, a first gate enabled upon receipt in coincidence of command signals indicating that said queue is full and a request for a trunk scanner entry to set said gate disabling means, said gate disabling means upon being set disabling said gating means coupled to said latch means to prevent said latch means from being operated to said first state, and a second gate enabled upon receipt in coincidence of command signals indicating that said queue is empty and an established timing interval to reset said gate disabling means, to thereby remove the priority override of said billing buffer entry selector.

5. The communication system of claim 4, wherein said gate disabling means comprises a flip-flop circuit.

6. The communication system of claim 4, wherein said gate disabling means is further operable to stop said trunk scanner when set, whereby trunk scanner data is not lost.

7. The communication system of claim 1, wherein said gating means coupled to said latch means comprises a first gate operated upon receipt in coincidence of established command signals to set said latch means in said first state and a pair of gates and an inverter operated upon receipt in coincidence of established command signals to reset said latch means in said second state, said latch control means being coupled to and disabling said first gate when operated and further coupled to and enabling one of said pair of gates when operated to set said latch means in said second state.

* * * * *